Feb. 27, 1951     O. KROLL     2,543,529
BEET HARVESTER

Filed Dec. 2, 1947     4 Sheets-Sheet 1

INVENTOR
Oscar Kroll
ATTORNEYS

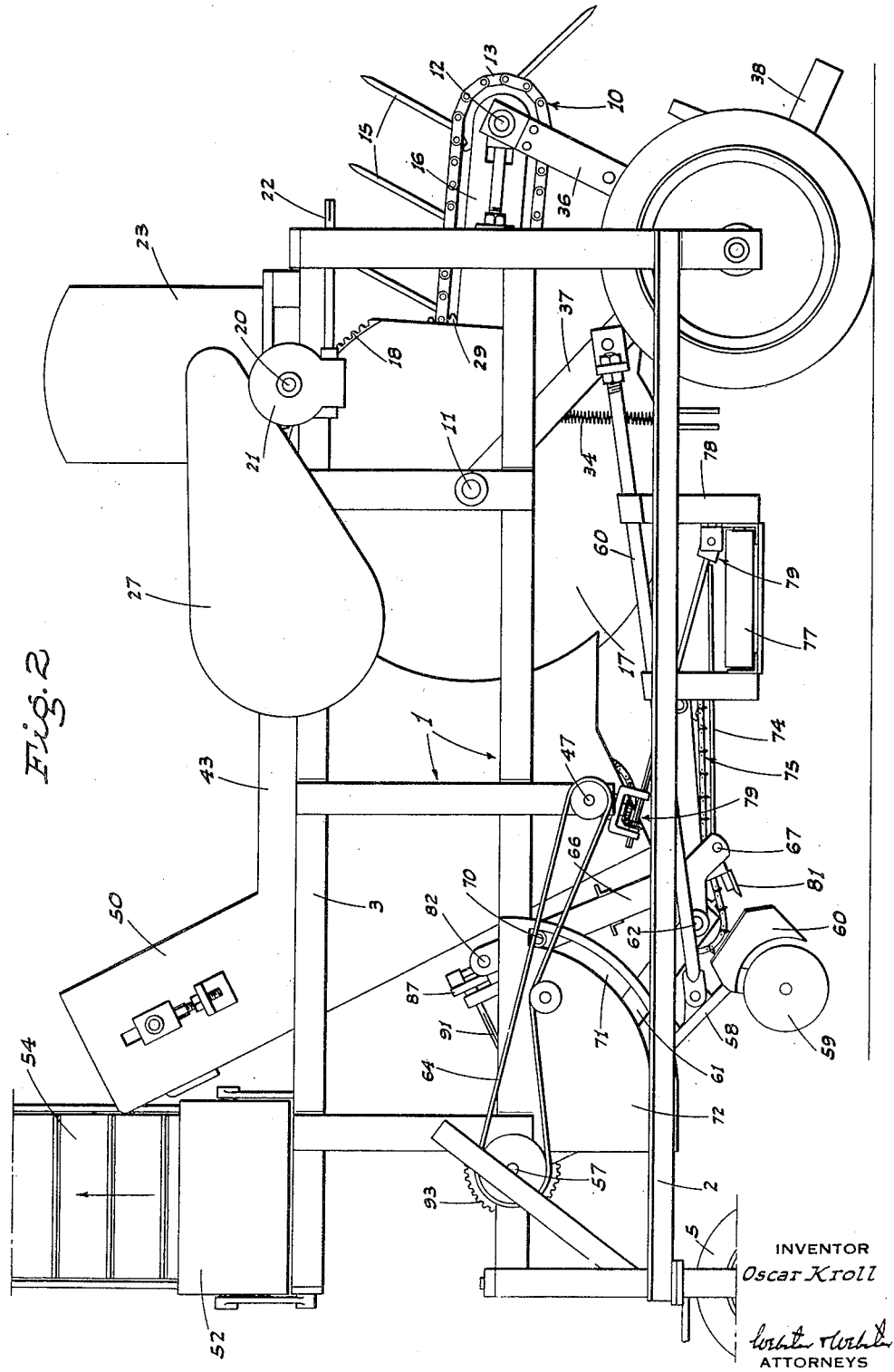

Feb. 27, 1951 O. KROLL 2,543,529
BEET HARVESTER
Filed Dec. 2, 1947 4 Sheets-Sheet 3
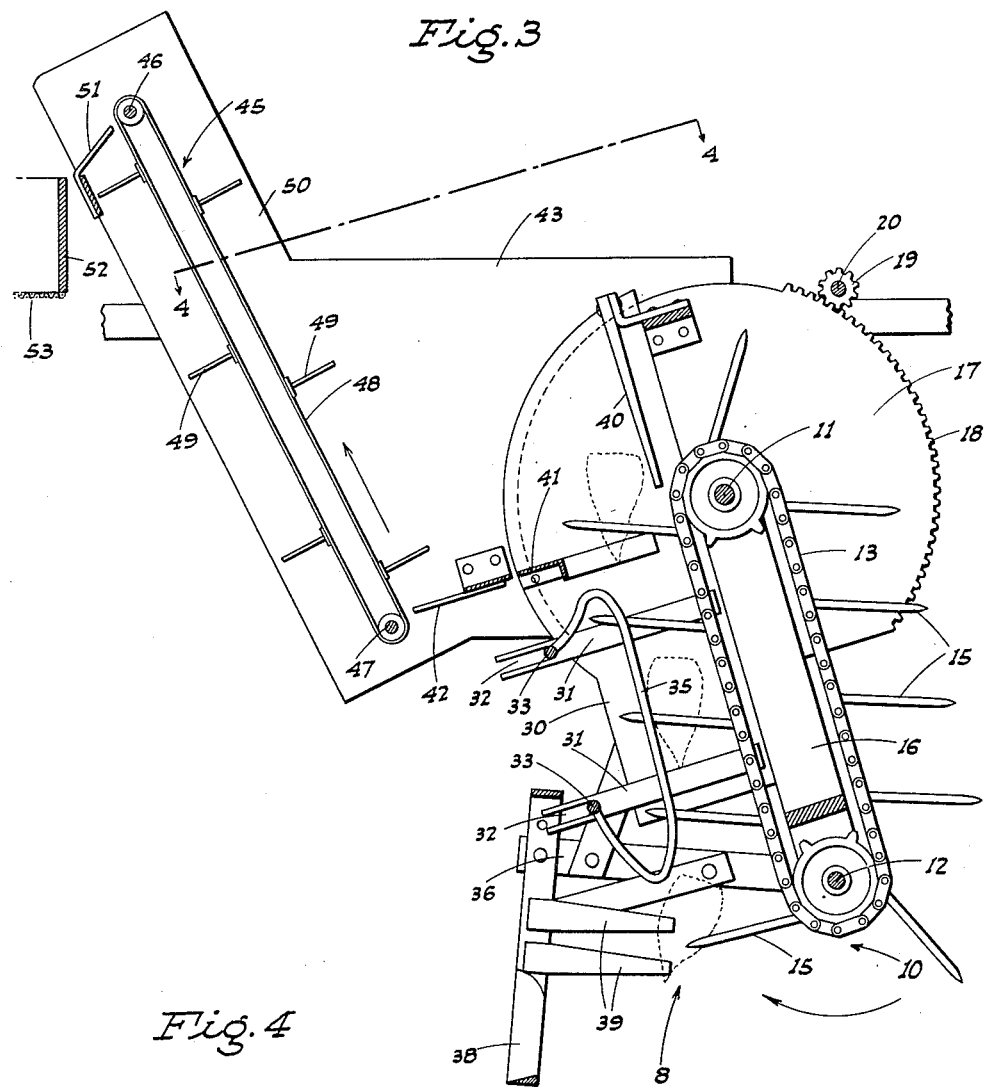
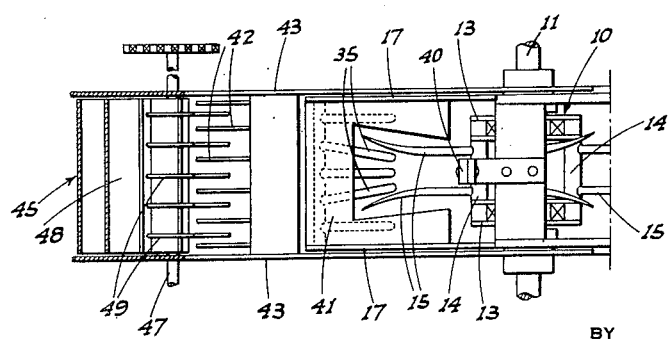
INVENTOR
Oscar Kroll Feb. 27, 1951     O. KROLL     2,543,529
BEET HARVESTER Filed Dec. 2, 1947     4 Sheets-Sheet 4

INVENTOR
Oscar Kroll
BY
ATTORNEYS

Patented Feb. 27, 1951

2,543,529

UNITED STATES PATENT OFFICE 2,543,529

BEET HARVESTER

Oscar Kroll, Pleasant Grove, Calif.

Application December 2, 1947, Serial No. 789,305

2 Claims. (Cl. 55—107)

This invention has for an object the provision of a novel, power-actuated harvester for sugar beets or the like.

Another object of the invention is to provide a beet harvester which is operative, upon advance along a beet row and in sequence, to cut and deflect laterally weeds or vines along the row which may be entangled with the beet tops; to then automatically top the beets and windrow the cut tops to one side of the row; to thereafter loosen the beets in the ground and elevate them therefrom; and to finally free the beets from dirt etc. and discharge them from the harvester into an adjacent receiving vehicle such as a truck traveling alongside said harvester.

An additional object of the invention is to provide a beet harvester which includes a novel topping unit.

A further object of the invention is to provide a beet harvester which includes a novel beet digging and elevating unit.

It is also an object to provide a beet harvester wherein the beet topping unit, and beet digging and elevating unit, are vertically adjustable between a lowered working position and a raised transport position; said units being coupled in novel manner for simultaneous adjustment.

A further object of the invention is to provide a practical, efficient, and reliable beet harvester, and yet one which will be exceedingly effective for the purpose for which it is designed.

These objects are accomplished by means of such structure and relative arrangement of parts as will fully appear by a perusal of the following specification and claims.

In the drawings:

Fig. 2 is a similar view, but shows said units in raised transport position.

Fig. 3 is a fragmentary sectional elevation of the digging and elevating unit.

Fig. 4 is a fragmentary sectional plan on line 4—4 of Fig. 3.

Figure 1:
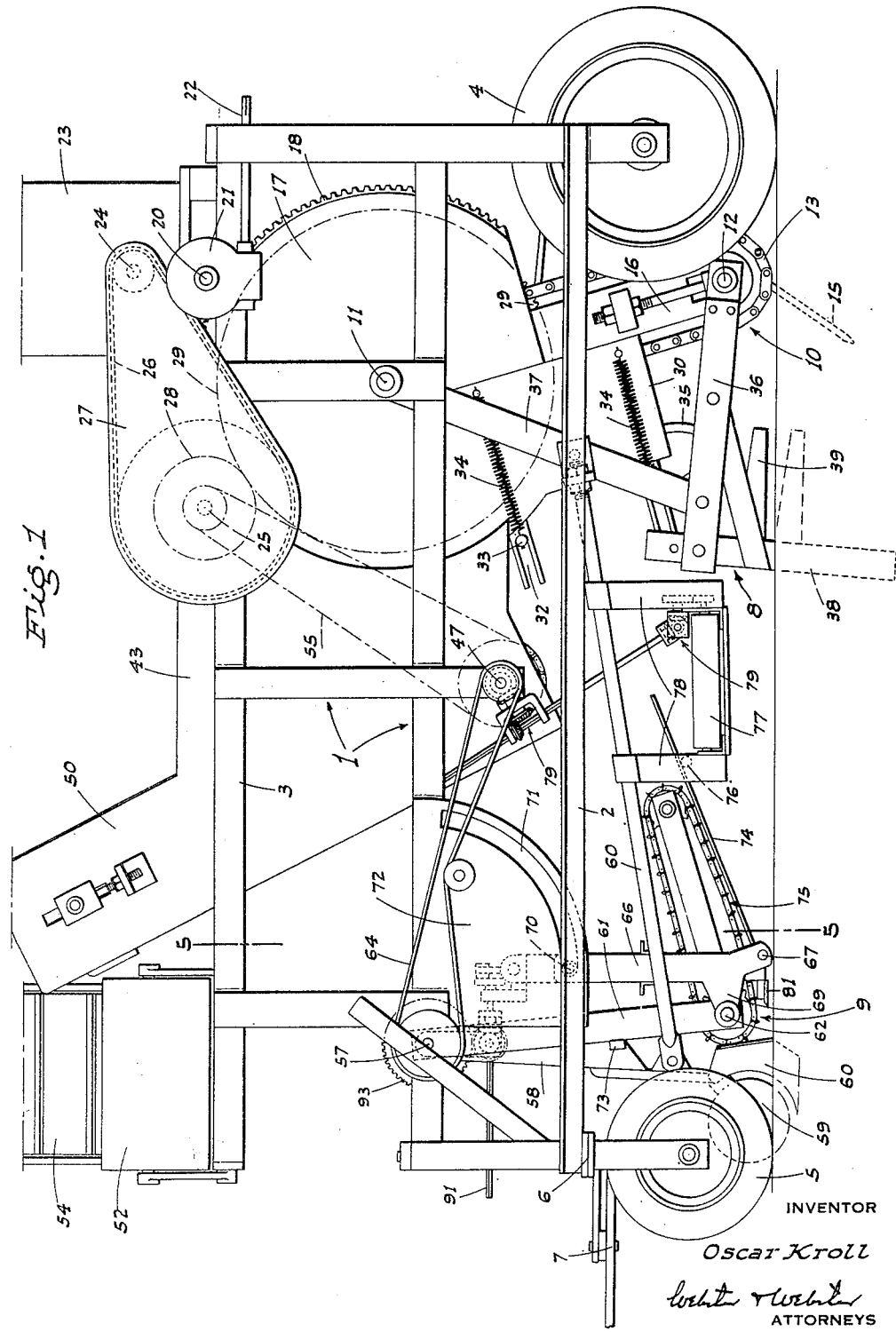
Fig. 1 is a side elevation of the harvester as in use; both the topping unit and digging and elevating unit being shown in lowered working position.
Figure 5:
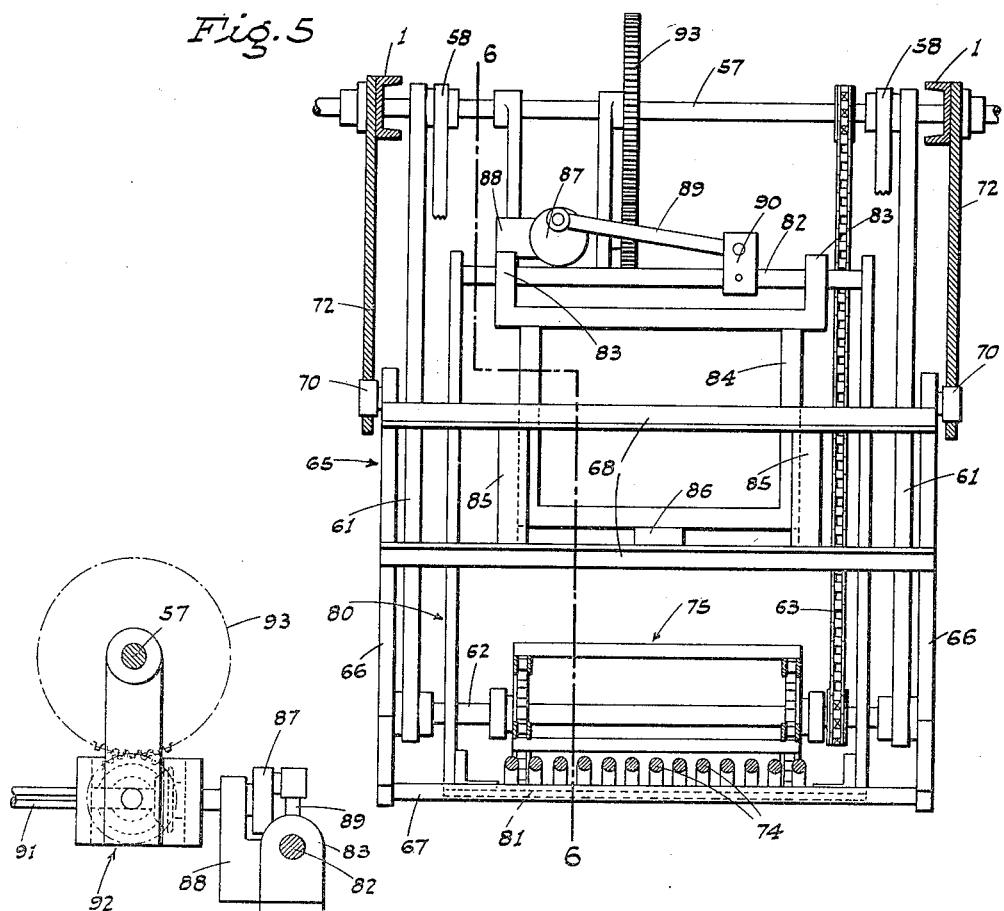
Fig. 5 is a cross section on line 5—5 of Fig. 1, showing the working parts of the topping unit.
Figure 6:
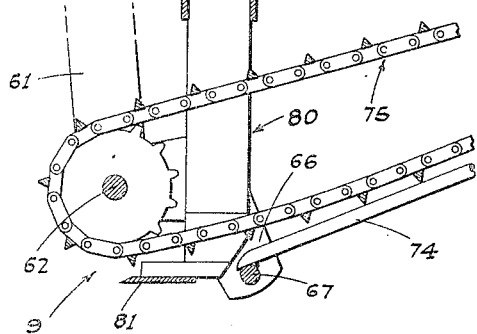
Fig. 6 is a cross section on line 6—6 of Fig. 5.

Referring now more particularly to the characters of reference on the drawings, the harvester comprises an elongated main frame, indicated generally at 1, such frame including an upstanding skeleton structure which has transversely spaced bottom side beams 2 and similarly spaced top side beams 3, together with other suitable frame beams and braces, as illustrated. The main frame is wheel-supported for movement along the ground, the rear wheels being indicated at 4, while the front wheels are indicated at 5. The front wheels 5 are arranged in connection with a steerable mount or truck 6 from which a draft tongue 7 projects forwardly for connection to a tractor.

The main frame 1 supports a beet digging and elevating unit, indicated generally at 8, and—in advance thereof—a beet topping unit, indicated generally at 9.

The beet digging and elevating unit 8 will first be described, and comprises:

Mounted centrally between the rear wheels 4, and disposed when in working position at a forward and upward incline, is a beet digging and elevating conveyor, indicated generally at 10, such conveyor turning in the direction of the arrow indicated in Fig. 3 and being swingably supported, at its upper end, by means of a top cross shaft 11; the lower cross shaft of said conveyor 10 being indicated at 12. The beet digging and elevating conveyor 10 includes a pair of transversely spaced endless chain and sprocket units 13 having cross pins 14 connecting the same at evenly spaced points. Each cross pin 14 is provided with an outwardly projecting pair of tines 15 in transversely spaced relation, with the outer ends of said tines being flared laterally outward. Each pair of outwardly projecting tines 15 forms in effect a fork, and said tines are disposed on the cross pins 14, which are non-rotatable, at such angle that when in the upwardly moving run of the conveyor 10 when in working position, said forks are substantially horizontal.

The beet digging and elevating conveyor 10 includes a rigid conveyor frame 16 which, as previously indicated, is adjustable about the top cross shaft 11 as an axis; such conveyor frame 16 being rigidly fixed in connection with, and disposed between, a pair of transversely spaced discs 17 journaled on said top cross shaft 11. The trailing edge of the discs 17 are formed as gear segments 18, with which pinions 19 mesh; said pinions being fixed on a cross shaft 20 which is selectively and reversibly rotatable from one end by a worm gear box 21 adapted to be operated by means of a shaft 22. The shaft 22 may be run by a crank, or from the power mechanism of the implement, as desired.

It will be seen that upon rotation of the cross shaft 20 and pinions 19, the discs 17 will turn about the top cross shaft 11 to swing the conveyor 10 from its working position, as in Fig. 1, rearwardly and upwardly to a transport position, as in Fig. 2.

The top cross shaft 11 is the drive shaft for the conveyor 10, and said shaft is driven in the following manner:

An engine (not shown) is mounted atop the main frame 1 at the rear in an engine housing 23, and the engine shaft 24 projects laterally from said housing on one side. Ahead of the engine housing 23, the main frame 1 is fitted, at the top, with a transverse counter-shaft 25, there being an endless speed-reducing drive 26 between the engine shaft 24 and the counter-shaft 25. The endless drive 26 is disposed within a protective shield 27. The counter-shaft 25 carries a relatively small gear, indicated diagrammatically at 28, while the top cross shaft 11 carries a relatively large gear, indicated diagrammatically at 29, in mesh with said gear 28; the large gear 29 lying to the outside of one of the discs 17. With the above arrangement an effective drive is imparted to the beet digging and lifting conveyor 10 without restricting swinging or adjusting motion of the latter between its lowered working position and raised transport position.

At the normally bottom part thereof the discs 17 are formed with downwardly projecting, transversely spaced skirts 30, between which the forward and upwardly traveling run of the conveyor 10 passes when the harvester is in operation.

The conveyor frame 16 includes upper and lower pairs of transversely spaced, forwardly projecting arms 31 longitudinally slotted at their free ends, as at 32, and corresponding cross rods 33 extend between said pairs and ride in the slots. The cross rods 33 are normally urged toward the conveyor 10 by connected tension springs 34. A plurality of transversely spaced, generally C-shaped presser fingers 35 connect the cross rods 33 in forwardly opening relation, i. e. project toward the conveyor and being so disposed that the tines 15 will pass therebetween in adjacent but clearance relation.

Mainly below the above described presser unit, the harvester includes the following plow assembly:

A pair of transversely spaced push beams 36 project forwardly from the journals of the lower cross shaft 12 on opposite sides of the conveyor, and connect with push beams 37 which depend from the upper end of said conveyor 10.

At the front thereof the push beams 36 carry a forwardly opening, generally U-shaped plow 38, the lead edges of which are preferably sharpened. The plow 38 is suitably braced from, and vertically adjustable relative to, the push beams 36, and carries rearwardly and inwardly converging deflectors 39 which tend to straighten up laterally tilted beets passing therebetween.

With advance of the harvester in straddling relation along a beet row the beet topping unit 9, whose structure and functions will hereinafter be described in detail, tops the beets, and thence the beets in the row are dug and elevated by the above described beet digging and elevating unit 8, as follows:

As the harvester travels along the row, the U-shaped plow 38 cuts below, and to the sides of, the beets in the row, loosening the dirt about said beets. The conveyor 10 is set so that the tines 15 dig relatively deeply into the ground, and the speed of the conveyor 10 relative to the speed of forward advance of the harvester is such that the forks formed by said tines 15 sweep through the ground and engage a beet in generally straddling relation, and from the back side. Thereafter, as each fork begins its upward travel in the forward run of the conveyor 10, the engaged beet as straddled by the fork is swept out of the ground and carried upwardly, soon being engaged by the assembly of the presser fingers 35 to prevent accidental escape of such beet from the fork.

As it approaches the upper end of the conveyor 10, each beet is detached from the engaged fork, i. e. swept away from the tines 15, by a stripper bar 40 mounted to pass between each pair of tines. This stripper bar acts to sweep each beet from the corresponding fork after the latter has traveled to a point slightly above a transverse platform 41 carried between the discs 17 normally at the front thereof, and the platform then registers with a grate 42 ahead thereof.

Beets as stripped from the forks fall onto the platform 41 and grate 42; the latter permitting dirt etc., which falls from the beets, to escape.

The harvester includes side plates 43 mounted on the main frame 1, forming in effect the sides of a hopper 44, a part of the bottom of which is comprised of the platform 41 and grate 42. At their rear edges the side plates 43 are generally symmetrical to, and closely lap, the discs 17. The front portion of the hopper 44 is an elevator conveyor, indicated generally at 45, which extends from its lower end adjacent the grate 42 at an upward and forward incline.

The elevator conveyor 45 includes a top cross shaft 46, a bottom cross shaft 47, an endless draper 48, and transverse rows of outwardly projecting conveyor elements 49 whose spacing and positioning is such that each row of said elements passes through the grate 42, which grate is open-ended for this purpose.

As the beets are stripped from the forks of the conveyor 10, and fall into the hopper 44 on the grate 42, they are engaged by the top run of the elevator conveyor 45.

At the top thereof said elevator conveyor 45, which runs between extensions 50 of the side plates 43, discharges forwardly over a deflector grill 51 into a shaker box 52 on the top front part of the main frame 1; such shaker box including a perforate bottom 53 to permit of the escape of dirt from the beets as shaken in said box. The shaker box 52 is power actuated in any suitable manner.

From the shaker box 52 the beets are picked up and conveyed at a lateral and upward incline by a similarly disposed elevator conveyor 54. The latter is of a length such that it may discharge into the body of a truck traveling alongside the harvester.

The elevator conveyor 45 is driven from the bottom cross shaft 47 by an endless drive 55, while the elevator conveyor 54 can be driven from any one of the drive shafts of the harvester.

The beet topping unit 9 which travels and works ahead of the beet digging and elevating unit 8 is constructed as follows:

The main frame 1 includes transversely spaced, intermediate beams 56 between which a top cross shaft 57 is journaled.

A pair of transversely spaced standards 58 depend in swingable relation from the top cross shaft 57 and are connected together as a rigid frame. At their lower ends the standards 58 each include a coulter 59 trailed by an outwardly flaring deflector blade 60; the coulters, together with trailing blades, running on opposite sides of the beet row to cut entangled vines etc. from the cut material and to deflect such cut material laterally of the row so that it does not interfere with the subsequent topping operation.

The connected together standards 58 are each linked by a longitudinal tie rod 60 with the beet digging and elevating unit; such rods 60 being attached, at their rear ends, to the suspension beams 37, as shown.

A pair of transversely spaced legs 61 are journaled at their upper ends on the top cross shaft 57 and depend to a point normally adjacent but clear of the ground, and at their lower ends said legs carry a bottom cross shaft 62; said bottom cross shaft 62 being driven from the top cross shaft 57 by an endless chain and sprocket unit 63; said top shaft 57 being driven from the cross shaft 57 by an endless drive 64.

A generally rectangular, upstanding, and transversely extending carrier frame, indicated generally at 65, is disposed somewhat to the rear of the legs 61, and includes side posts 66, a bottom beam 67, and—adjacent the upper portion thereof —vertically spaced pairs of front and rear cross beams 68; all connected together in a rigid structure.

Adjacent their lower ends the side posts 66 include forwardly projecting ears 69 which are pivotally connected to the bottom cross shaft 62. Adjacent their upper ends the side posts 66 are fitted, on the outside, with rollers 70 which run is rearwardly and upwardly curving cam slots 71 in side plates 72 on the main frame.

Stop blocks 73, projecting from the standards 58, are normally engaged by the front edge of the legs 61. Thus when the beet digging and elevating conveyor 10 is swung rearwardly and upwardly, the tie rods 60 will pull the standards 58 through a similar path, raising the coulters 59 and deflector blades 60 clear of the ground to a transport position. Similarly, the blocks 73, abutting against the legs 61, swing them rearwardly and upwardly, together with the carrier frame 65. However, by reason of the particular mounting arrangement, including the rollers 70 running in the cam slots 71, said carrier frame 65 tends to remain substantially dependent at all times.

At the lower end of the carrier frame 65, the bottom beam 67 is fixed with the forward end of an upwardly and rearwardly inclined longitudinal grate 74, and working on top of said longitudinal grate 74 is a bottom feed endless conveyor 75 pivotally mounted on and driven from the bottom cross shaft 62.

The rear end portion of the longitudinal grate 74 slidably rests on a cross rod 76 at the front of a horizontal lateral conveyor 77 disposed beneath the main frame between the units 8 and 9, and suspended from the tie rods 60 by hangars 78. With this arrangement the grate 74 and conveyor 75 always deliver to the lateral conveyor 77, regardless of the position of vertical adjustment of the beet topping unit 9. See Figs. 1 and 2. The lateral conveyor 77 is driven by a universal and extensible drive assembly, indicated generally at 79.

The beet topping unit 9 includes, in combination with the above described arrangement, a sickle which comprises:

Within the carrier frame 65, and between the front and rearmost ones of the cross beams 68, in laterally reciprocable relation, there is a rectangular, upstanding shuttle frame 80 carrying, at its lower end, directly ahead of the bottom beam 67, a sickle blade 81; such sickle blade being disposed directly beneath the forward end portion of the bottom feed conveyor 75 and directly ahead of the lower end of the longitudinal grate 74.

With advance of the implement, the sickle blade 81, which is reciprocated transversely in the manner hereinafter described, tops the beets in the row being traversed, the cut off beet tops then being fed by the bottom feed conveyor 75 rearwardly up the longitudinal grate 74 and discharged onto the lateral conveyor 77, which conveyor feeds the cut beet tops to a point laterally of the machine and there windrows them.

The rectangular shuttle frame 80 includes, at its upper end, a transversely reciprocable bar 82 which is journaled in transversely spaced upstanding bearings 83 on the upper end of a rectangular floating frame 84. The frame 84 is capable of limited vertical floating to prevent of breakage of the sickle bar 81, in the event of undue upward pressure thereon. The floating frame 84 is carried in guides 85 between the front and rear ones of the cross beams 78; there being a stop block 86 to restrict downward vertical motion of the floating frame 84 beyond a predetermined point.

A crank 87 is rotatably mounted on a bracket 88 on one end of the floating frame 84, and a connecting rod 89 extends between the crank 87 and an attachment block 90 on the transversely reciprocable bar 82. The crank 87 is fitted with a pitman drive shaft 91, which is actuated by a universal and extensible drive assembly, indicated generally at 92. This universal and extensible drive assembly 92 is arranged so that the beet topping unit 9 may be freely adjusted between its lowered working position and raised transport position without interference by said assembly; the latter including a gear 93 on the top cross shaft 57 running in mesh with a relatively smaller gear of the assembly 92.

When the above described harvester is in use, the beet digging and elevating unit 8 is lowered into its working position, which automatically effects lowering of the beet topping unit 9 to a similar position, by reason of the inter-connection of such units by the tie links 60. Thereafter, as the implement advances along the ground the beets are topped by the unit 9 and the tops windrowed, and thence the beets are loosened, dug, and elevated by the unit 8, finally being discharged laterally of the harvester at an elevated point into a truck.

This invention provides an efficient machine for the automatic or power harvesting of sugar beets or the like; such machine being reliable in its structure, while not unduly complicated for ready maintenance etc.

From the forgoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the fol- lowing is claimed as new and useful, and upon which Letters Patent are desired:

1. A beet harvester comprising a frame supported for movement along the ground, a power actuated beet digging and elevating unit pivotally mounted on the frame for rearward swinging adjustment between a lowered working position and a raised transport position, a leading, power actuated beet topping unit pivotally mounted on the frame for rearward swinging adjustment between a lowered working position and a raised transport position, transversely spaced tie rods pivotally connecting said units for simultaneous adjustment between said positions, means to effect such adjustment, a lateral conveyor suspended from the tie rods, and means to feed beet tops from the topping unit to the lateral conveyor.

2. A beet harvester comprising a frame supported for movement along the ground, a power actuated beet digging and elevating unit pivotally mounted on the frame for rearward swinging adjustment between a lowered working position and a raised transport position, a leading, power actuated beet topping unit pivotally mounted on the frame for rearward swinging adjustment between a lowered working position and a raised transport position, transversely spaced tie rods pivotally connecting said units for simultaneous adjustment between said positions, means to effect such adjustment, a lateral conveyor suspended from the tie rods, a rearwardly extending, longitudinal grate secured to the topping unit and slidably seating on the lateral conveyor, and a bottom feed conveyor working in cooperation with the grate from above.

OSCAR KROLL.

REFERENCES CITED

The following references are of record in the file of this patent:

UNITED STATES PATENTS

| Number | Name | Date |
| --- | --- | --- |
| 659,773 | Tucker | Oct. 16, 1900 |
| 814,747 | Sullivan | Mar. 13, 1906 |
| 919,342 | Gettlemann | Apr. 27, 1909 |
| 987,202 | Wichertjes | Mar. 21, 1911 |
| 1,282,205 | Fanger | Oct. 22, 1918 |
| 1,283,810 | Kuky | Nov. 5, 1918 |
| 1,288,541 | Fant | Dec. 24, 1918 |
| 1,498,914 | Hoffman | June 24, 1924 |
| 1,748,746 | Zuckerman | Feb. 25, 1930 |
| 2,430,665 | Briggs | Nov. 11, 1947 |

FOREIGN PATENTS

| Number | Country | Date |
| --- | --- | --- |
| 11,415 | Austria | Apr. 10, 1903 |
| 15,050 | Great Britain | Dec. 2, 1909 |
| 20,002 | Denmark | Mar. 22, 1915 |
| 71,902 | Austria | June 10, 1916 |